United States Patent [19]

Hogan

[11] 4,025,707

[45] May 24, 1977

[54] MIXED HYDROCARBYLOXIDE TREATED CATALYST ACTIVATED AT DIFFERENT TEMPERATURES

[75] Inventor: John P. Hogan, Bartlesville, Okla.

[73] Assignee: Phillips Petroleum Company, Bartlesville, Okla.

[22] Filed: Feb. 25, 1976

[21] Appl. No.: 661,083

Related U.S. Application Data

[62] Division of Ser. No. 455,740, March 28, 1974, Pat. No. 3,959,178.

[52] U.S. Cl. .............................. 526/105; 526/350
[51] Int. Cl.² ..................... C08F 4/24; C08F 4/52; C08F 10/00
[58] Field of Search ................................... 526/105

[56] References Cited

UNITED STATES PATENTS

| | | | |
|---|---|---|---|
| 3,081,286 | 3/1963 | McKinnis | 526/105 |
| 3,158,594 | 11/1964 | Weil et al. | 526/105 |
| 3,629,216 | 12/1971 | Iwasaki et al. | 526/105 |
| 3,639,378 | 2/1972 | Long | 526/105 |
| 3,639,381 | 2/1972 | Craven | 526/105 |
| 3,759,918 | 9/1973 | Yamaguchi et al. | 526/105 |
| 3,767,635 | 10/1973 | Yamaguchi et al. | 526/105 |
| 3,878,179 | 4/1975 | Hogan | 526/105 |
| 3,891,611 | 6/1975 | Abe et al. | 526/105 |
| 3,956,257 | 5/1976 | Hogan | 526/105 |
| 3,959,178 | 5/1976 | Hogan | 526/104 |

*Primary Examiner*—Alan Holler

[57] ABSTRACT

Ethylene homopolymers and copolymers are made in a particle form process over a mixed catalyst comprising several portions of the same or different supported chromium components and metal promoted variations thereof in which each portion is activated at a different temperature, thereafter combined, and the composite, or each activated portion before being combined, is post treated with a hydrocarbyl aluminum hydrocarbyloxide. Broad molecular weight polymers are produced having excellent die swell characteristics and acceptable environmental stress cracking resistance and flow properties; this is achieved and while at the same time realizing high productivities.

15 Claims, No Drawings

MIXED HYDROCARBYLOXIDE TREATED CATALYST ACTIVATED AT DIFFERENT TEMPERATURES

CROSS REFERENCE TO RELATED APPLICATION

This is a divisional of copending application Ser. No. 455,740, filed Mar. 28, 1974 U.S. Pat. No. 3,959,178.

BACKGROUND OF THE INVENTION

This invention relates to activation of olefin polymerization catalysts.

Supported chromium oxide catalysts can be used to prepare olefin polymers in a hydrocarbon solution to give a product having excellent characteristics from many standpoints. Supported chromium oxide catalysts can also be used to prepare olefin polymers in a slurry system wherein the polymer is produced in the form of small particles of solid material suspended in the diluent. This process, frequently referred to as a particle-form process, has the advantage of being less complex but does not produce polymers which are exactly comparable to the solution polymers. There are certain applications where it is necessary to have the properties associated with solution process polymer. It has been found previously that a satisfactory composition can frequently be obtained by blending a solution form polymer and a particle form polymer, but this involves the extra expense of compounding the blend. Specifically, in the area of blow molding of bottles and the like, it is desired to have polymer with a broad molecular weight distribution and low die swell, characteristics not generally associated with particle-form polymer. Consequently, it has been necessary to produce these grades of resins either from solution-form polymer or from blends of solution-form and particle-form polymer.

BRIEF SUMMARY OF THE INVENTION

It is an object of this invention to provide a simpler method of producing polymer suitable for blow molding; it is a further object of this invention to produce polymer by a particle-form process which has characteristics associated with solution polymerized polymer or blends of solution polymerized with particle-form polymer; it is still yet a further object of this invention to avoid the extra expense of blending to obtain satisfactory bottle grade resins; and it is still yet a further object of this invention to produce, at high productivities, particle-form polymer having low die swell, acceptable flow properties and acceptable environmental stress cracking resistance.

In accordance with the invention, a mixed supported chromium oxide catalyst is produced by activating each of at least two portions at a different temperature, and thereafter combining the separate portions, said thus activated portions being post treated with a hydrocarbyl aluminum hydrocarbyloxide either before or after being combined.

DESCRIPTION OF THE PREFERRED EMBODIMENTS

The invention is concerned with the preparation at high productivity rates, of broad molecular weight distribution ethylene polymers having acceptable flow properties and environmental stress cracking resistance and outstanding die swell characteristics. These polymers which are produced with the catalysts made in accordance with this invention are normally solid homopolymers of ethylene or copolymers of ethylene with another 1-olefin containing 3 to 8 carbon atoms per molecule. As an example, the olefin polymer can be produced from at least one aliphatic mono-1-olefin having 2-8 carbon atoms per molecule. Exemplary copolymers include those of ethylene/propylene, ethylene/1-butene, ethylene/1-hexene, and ethylene/1-octene and the like. The major portion of such copolymers is derived from ethylene and generally consists of about 95 to about 99 mole percent of ethylene. These polymers are well suited for extrusion, blow molding, injection molding and the like.

Each portion of the mixed catalyst utilized in practicing this invention consists of a supported chromium oxide which is thereafter combined with the other portion or portions. Either the composite or the individual portions are treated with a hydrocarbyl aluminum hydrocarbyloxide at about room temperature prior to starting the polymerization process.

Suitable supports for each portion include silica, silica-alumina, silica-titania and the like. The supports are particulate in nature and they can be prepared by precipitation and coprecipitation techniques or by mixing silica with other refractory materials. For example, sodium silicate can be added to an acid such as sulfuric acid, the resulting precipitate aged for at least one hour, the water-soluble salts removed, and then the water removed by azeotropic distillation with a material such as ethyl acetate. Silica constitutes the major portion of the support with the other metal compound or compounds when used making up from 0.1 to about 20 wt. percent of the finished catalyst. The support can also be impregnated with a promoter metal compound such as a titanium compound prior to activating each portion. Alternatively, it can be coprecipitated with a titanium compound. Each portion of the support is admixed with 0.1 to about 10 weight pecent of a chromium compound prior to activation.

The chromium compound can be a water-soluble salt such as chromium nitrate, chromium acetate, chromium trioxide and the like or an organic chromium compound such as tert-butyl chromate, chromium acetylacetonate, and the like. The organochromium compound can be dissolved in a non-aqueous solvent such as pentane, hexane, benzene and the like and the solution is preferably added to the substantially dry support. As noted hereinabove, each portion can be identical or can be different. Thus one portion could have chromium deposited from an aqueous water-soluble salt before drying and the other portion have chromium deposited from a non-aqueous solvent after drying. Each of the resulting mixtures which are to form the two or more portions of the composite catalyst of this invention are dried and are then activated in dry air at an elevated temperature for about one-half to about 50 hours, more preferably 2 to 10 hours. At least a substantial portion of chromium in lower valence states is converted to the hexavalent form.

The portion of the mixed catalyst which is activated at the lower temperature can be activated at a temperature within the range of 500° to 1100° F, preferably 700° to 1000° F. The portion which is to be activated at the higher temperature can be activated at a temperature within the range of 1200° F to 2000° F, preferably 1300° to 1600° F. Preferably, there will at all times be a difference of at least 200° F between the highest temperature that any portion is activated and the lowest temperature at which any portion is activated.

The weight ratio of the low temperature activated portion or portions to the high temperature activated portion or portions can vary from 1:6 to 12:6, and will preferably be within the range of 2:6 to 6:6, (1:3 to 1:1), that is preferably from 1 to 3 parts by weight of the low temperature activated portion to each three parts by weight of the high temperature activated portion.

After activation, each portion of the mixed catalyst is cooled and at least one low temperature activated portion and at least one high temperature activated portion are combined to form a composite which is treated with a hydrocarbyl aluminum hydrocarbyloxide at about room temperature either prior to polymerization or in situ in the reactor prior to admitting the monomer or mixture of monomers. Alternatively each portion can be treated after activation but before combination; this would be done prior to use in a polymerization reaction. The hydrocarbyl aluminum hydrocarbyloxides are those represented by the following formula $AIR_a(OR')_b$ wherein R and R' are the same or different and are alkyl, aryl and cycloalkyl radicals and combinations thereof such as alkaryl, alkylcycloalky, etc., each radical containing from 1 to about 10 carbon atoms, preferably 1 to 6, a and b are integers of 1 or 2, and a plus $b = 3$. Exemplary compounds include diphenylaluminum phenoxide, p-tolylaluminum dibutoxide, di-n-propylaluminum methylcyclohexoxide, isobutylaluminum diisobutoxide, dimethylaluminum methoxide, diethylaluminum ethoxide, diethylaluminum n-propoxide, diethylaluminum t-butoxide, diisobutylaluminum isobutoxide, di-n-propylaluminum n-propoxide, di-2-methylpentylaluminum ethoxide, dimethylauminum decanoxide, diethylaluminum phenoxide, and the like. Presently preferred are the dialkylaluminum alkoxides. The hydrocarbyl aluminum hydrocarbyloxides can be prepared by reacting a hydrocarbon solution of a trihydrocarbyl aluminum with a hydrocarbon solution of an alcohol at about 1/1 to ½ molar ratio. After the reaction is completed, the required amount of solution is used to treat the composite or the separate portions of catalyst before compositing. The solvent is preferably the same as that used as the diluent in the polymerization i.e., isobutane pentane, or the like, but it can also be different. The amount of hydrocarbyloxide can range from about 0.5 to about 10 weight percent based on the weight of the composite being treated with about 1 to about 8 weight percent being preferred.

The particle-form process in which the catalyst of the present invention is particularly applicable is a process in which at least one olefin is polymerized at a temperature in the range of about 150°–230° F by means of the catalyst of the invention. The catalyst is maintained in suspension and is contacted with the olefin or mixture of olefins in an organic medium at pressures sufficient to maintain the medium and at least a portion of the olefins in the liquid phase. The medium and temperatures are such that the polymer produced is insoluble in the medium and is recovered in the form of solid particles. The organic medium (diluent) is generally a paraffin and/or cycloparaffin having from 3 to 12 carbon atoms per molecule. Representative examples include propane, butane, isobutane, pentane, isopentane, cyclohexane, normal dodecane, methylcyclohexane and the like. Pressures can range from about 100 to 700 psig or higher, and catalyst concentrations can range from about 0.001 to about 1 weight percent based on the weight of the reactor contents. Hydrogen can be used to modify the molecular weight of the polymers produced in the process if desired. The process for preparing the polymers in particles form is broadly disclosed in British 853,414, complete specification published Nov. 9, 1960, and later variations are disclosed in U.S. Pat. No. 3,644,323, issued Feb. 22, 1972, the disclosures of which are hereby incorporated by reference.

Polymers produced with the catalysts of the instant invention are readily processed in conventional plastics fabrication equipment. One measure of the processability is the melt index of the polymers, those having high melt indices being more easily handled than those having low melt indices. Melt indices of the polymers produced in the instant invention can range from about 0.1 to about 20 or even higher.

Broad molecular weight distribution polymers are produced with the catalyst of this invention. One indication of breadth of molecular weight distribution is given by the ratio between high load melt index (HLMI) determined according to ASTM D1238-57T, Condition F, and melt index (MI) determined acording to ASTM D1238-57T, Condition E. Similarly, the ratio between a "CIL" flow rate and melt index can be determined by measuring the "CIL" flow rate in a plastometer manufactureed by Canadian Industries Limited (CIL). In this method the flow rate of the polymer is determined at 1500 psig gas pressure through a capillary tube 0.176 inches long and 0.01925 inches inner diameter at 190° C. Polymers with broad molecular weight distributions are more shear sensitive and therefore exhibit higher HLMI/MI or CIL/MI ratios than polymers with narrow molecular weight distributions. Broad molecular weight distribution polymers, particularly those having a melt index of about 0.2–0.3 are quite useful in blow molding containers and the like since they exhibit good melt flow properties and the method articles have good resistance to environmental stress cracking.

A more subtle requirement for superior blow molding resins is related to parison die swell and weight swell. The polymers prepared with the catalyst of the instant invention have swell properties similar to those produced in a solution polymerization process or blends of solution polymerized polymers with particle form polymers.

CONTROL 1

A series of runs was made in a particle-form process in which ethylene/1-hexane copolymer was prepared over a commerical cataiyst comprising 2 weight percent chromium oxide on Davidson Type 952 silica, which is a microspheroidal silica containing about 0.1 wt. percent alumina. Catalyst activation temperature was varied and diethylaluminum ethoxide (DEAL-E) was used as an adjuvant. Isobutane was used as the diluent. All runs were of 2 hours duration and were made in the presence of 0.2 mole percent hydrogen based on total hydrocarbon (diluent and monomer). Sufficient 1-hexene was used in the process to obtain polymers having a density of about 0.950 g/cc. The reactor temperature was adjusted to obtain polymers having a melt index of about 0.3. The results are shown in Table 1.

Table 1

| Run No. | Catalyst Activation Temp. °F | DEAL-E Wt. % | Reactor Temp. °F | Catalyst Productivity Lbs.Polymer/ Lb. Catalyst | Polymer Properties MI (Pellets) | HLMI MI | CIL |
|---|---|---|---|---|---|---|---|
| 1 | 900 | 2.5 | 215 | 3800 | 0.33 | 104 | 2.2 |
| 2 | 900 | 3.5 | 205 | 3800 | 0.32 | 130 | 2.8 |
| 3 | 1000 | 2.5 | 222 | 4400 | 0.26 | 85 | 1.3 |
| 4 | 1100 | 2.5 | 221 | 4300 | 0.33 | 73 | 1.9 |

The results show that as the activation temperature of the catalyst is increased the HLMI/MI ratio of polymer produced over the catalyst is decreased and the productivity of the catalyst is increased somewhat. Run 2 shows that increasing the amount of DEAL-E gives polymers with higher HLMI/MI ratios. None of the runs, however, gave a good balance of high productivity and broad moleuclar weight distribution. That is, when catalyst activation temperature was increased, productivity increased but HLMI/MI ratio decreased sharply, showing that still higher activation temperature is not useful for this purpose.

EXAMPLE 1

Another series of runs was conducted in a manner similar to that of Control 1 except that the catalysts used consisted of a composite of the same supported chromium oxide in which each portion (two per catalyst) was activated at a different temperature. Polymers of about 0.950 g/cc density and about 0.3 melt index were produced. The results are presented in Table 2.

Table 2

| Run No. | Catalyst Composition Wt. Ratio | Act. Temp. °F | DEAL-E Wt. % | Reactor Temp. °F | Catalyst Productivity | Polymer HLMI MI |
|---|---|---|---|---|---|---|
| 5 | 1/3 | 800/1500 | 1.3 | 219[1] | 7000 | 115 |
| 6 | 1/3 | 800/1500 | 1.9 | 214 | 5400 | 99 |
| 7 | 2/3 | 800/1500 | 2.0 | 215 | 4500 | 105 |
| 8 | 1/1 | 800/1500 | 2.5 | 208 | 4800 | 122 |
| 9 | 1/1 | 900/1500 | 3.5 | 207 | 5800 | 111 |
| 10 | 1/3 | 800/1500 | 1.3 | 217 | 7100 | 99 |

[1]No hydrogen used, all others made in presence of 0.2 mole percent hydrogen.

The results show that as the ratio of low temperature activated catalyst to high temperature activated catalyst increases at approximately similar DEAL-E contents, the HLMI/MI ratio increases from 99 to 122 (Runs 6, 7 and 8). Comparison of the polymers made in Runs 3 (or 4) and 8, for instance, shows that when mixed catalysts made from a composite of two supported chromium oxide portions activated at different temperatures are used, polymers having greater HLMI/MI ratios are produced. Higher, rather than lower, catalyst productivities are obtained, thus giving an advantage in both respects as opposed to sacrificing one property to enhance another.

EXAMPLE 2

Parisons were extruded under identical conditions from: (a) ethylene/1-hexene copolymers prepared according to the invention, (b) ethylene/1- hexene copolymers prepared over chromium oxide-silica catalysts activated at one temperature and treated with diethylaluminum ethoxide, and (c) a commercial blow molding resin with a similar density and similar melt index. The commercial resin was a blend of polymers prepared over chromium oxide-silica catalysts which were not treated with a dialkyl aluminum alkoxide. The results are presented in Table 3.

Table 3

| | Parison Die Swell Properties | | | | | |
|---|---|---|---|---|---|---|
| | Invention | | Comparison | | | Control (a) |
| Run No. | 11 | 12 | 13 | 14 | 15 | 16 |
| Catalyst Used | | | | | | |
| Wt. Ratio | 1/3 | 1/3 | — | — | — | — |
| Activation Temp. °F | 800/1500 | 800/1500 | 900 | 1000 | 1100 | — |
| DEAL-E, Wt. % | 1.8 | 1.25 | 2.5 | 2.5 | 2.5 | — |
| Polymer Properties | | | | | | |
| Density, g/cc | 0.953 | 0.953 | 0.951 | 0.951 | 0.950 | 0.955 |
| Melt Index | 0.41 | 0.35 | 0.33 | 0.26 | 0.33 | 0.3 |
| High Load Melt Index | 40.0 | 38.0 | 34.4 | 22.1 | 23.9 | — |
| HLMI/MI Ratio | 97.2 | 108 | 104 | 85.0 | 72.4 | — |
| CIL | 3.0 | 2.4 | 2.5 | 1.5 | 1.7 | 2.6 |
| CIL/MI Ratio | 7.3 | 6.9 | 7.6 | 5.8 | 5.1 | 8.7 |
| Parison Swell | | | | | | |
| Top, % (b) | 24 | 27 | 44 | 41 | 36 | 24 |
| Bottom, % (b) | 22 | 22 | 36 | 28 | 29 | 22 |
| Weight Swell, % (c) | 150 | 121 | 223 | 195 | 177 | 128 |

(a)Commercial resin which is a physical blend of polymers prepared in solution polymerization and particle-form polymerization processes.
(b)Percent increase in diameter compared to outer diameter of die orifice.
(c)Determined by the formula: untrimmed part weight minus theoretical parison weight* X100/theoretical parison weight.
*Based on die gap setting calculated to give a theoretical part weight (trimmed) of 120 grams.

Inspection of the data presented in Table 3 shows that resins prepared with the catalyst of the invention (Runs 11 and 12) closely approach the die swell properties of a commercial blow molding resin (Run 16) having similar density and melt index. From a practical standpoint, it is important that new resins being developed for critical blow molding applications have die swell properties similar to resins already in use. Deviations from properties requires, in many instances, new dies or machining existing dies so that specification parts can be made with the new resins. Runs 13, 14 and 15 show that alkoxide-treated catalyst activated at a single temperature is not capable of producing polymers having the die swell properties similar to those of the commercial resin of Run 16.

While this invention has been described in detail for the purpose of illustration, it is not to be construed as limited thereby but is intended to cover all changes and modifications within the spirit and scope thereof.

What is claimed is:

1. A process which comprises: contacting at least one polymerizable olefin under polymerization conditions with a mixed catalyst produced by activating in dry air at least one first supported chromium oxide portion at a first temperature within the range of 500° to 1100° F; activating in dry air at least one second supported chromium oxide portion at a second temperature within the range of 1200° to 2000° F, said second temperature further being at least 200° F above said first temperature; said activating being sufficient to convert at least a portion of the chromium to the hexavalent state; thereafter combining said thus activated first and second portions to form a composite, the weight ratio of said first portion to said second portion being within the range of 1:6 to 12:6, and treating thus formed composite or said activated portions prior to combination with from 0.5 to 10 weight percent, based on the weight of said composition of a hydrocarbyl aluminum hydrocarbyloxide, said contacting being carried out in a liquid diluent at a temperature such that at least a substantial part of polymer produced is insoluble in said diluent.

2. A method according to claim 1 wherein said olefin is at least one aliphatic mono-1-olefin having 2–8 carbon atoms per molecule.

3. A method according to claim 2 wherein said olefin is ethylene, and said polymer thus produced is ethylene homopolymer.

4. A method according to claim 2 wherein said contacting is carried out a temperature within the range of 150° to 230° F and substantially all of said polymer is in particle form.

5. A method according to claim 2 wherein said diluent is a paraffin or cycloparaffin or mixture thereof having 3 to 12 carbon atoms per molecule.

6. A method according to claim 2 wherein said diluent is selected from the group consisting of propane, isobutane, cyclohexane, normal dodecane, and methyl cyclohexane.

7. A method according to claim 2 wherein said diluent is isobutane.

8. A method according to claim 2 wherein said polymer thus produced is a copolymer selected from group consisting of ethylene/propylene, ethylene/1-butene, ethylene/1-hexane, and ethylene/1-octene wherein 80 to 99 mole percent of polymer is a polymerized ethylene.

9. A method according to claim 2 wherein said first temperature is within the range of 700° to 1000° F and said second temperature is within the range of 1300° to 1600° F.

10. A method according to claim 2 wherein said hydrocarbyl aluminum hydrocarbyloxide is a dialkyl aluminum alkoxide.

11. A method according to claim 7 wherein a weight ratio of said first portion to said second portion is within the range of 1:3 to 1:1.

12. A method according to claim 11 wherein said hydrocarbyl aluminum hydrocarbyloxide is selected from the group consisting of dipbenylaluminum phenoxide, p-tolyaluminum dibutoxide, di-n-propylaluminum methylcyclohexoxide, isobutylaluminum diisobutoxide, dimethylaluminum methoxide, diethylaluminum ethoxide, diethylaluminum n-propoxide, diethylaluminum t-butoxide, diisobutylaluminum isobutoxide, di-n-propylaluminum n-propoxide, di-2-methylpentylaluminum ethoxide, dimethylaluminum decanoxide, and diethylaluminum phenoxide.

13. A method according to claim 11 wherein said hydrocarbyl aluminum hydrocarbyloxide is diethylaluminum ethoxide.

14. A method according to claim 11 wherein said chromium oxide in each portion is supported on a precipitated silica.

15. A method according to claim 14 wherein said chromium oxide in at least one portion is supported on a silica coprecipitated with a titanium compound.

* * * * *

UNITED STATES PATENT AND TRADEMARK OFFICE
CERTIFICATE OF CORRECTION

PATENT NO. : 4,025,707
DATED : May 24, 1977
INVENTOR(S) : John P. Hogan

It is certified that error appears in the above-identified patent and that said Letters Patent are hereby corrected as shown below:

Claim 8, line 10, "1-hexane" should be -- 1-hexene -- .

Claim 12, line 25, "dipbenylaluminum" should be -- diphenylaluminum --.

Signed and Sealed this

Twenty-seventh Day of September 1977

[SEAL]

Attest:

RUTH C. MASON
Attesting Officer

LUTRELLE F. PARKER
Acting Commissioner of Patents and Trademarks